Figure 2:
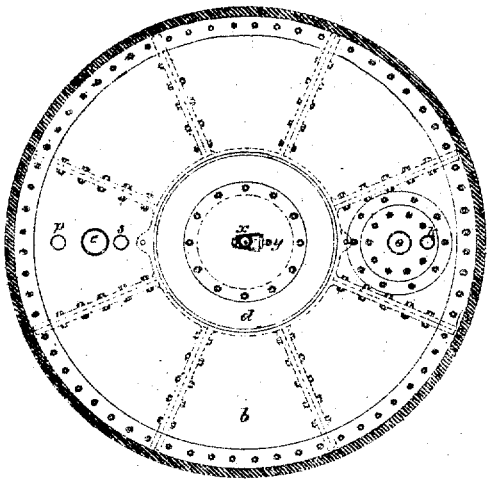

F. E SICKLES

Apparatus for Sinking Pneumatic Piles.

No. 4,953. Reissued June 18, 1872.

PLAN OF UPPER SIDE OF LOWER DIAPHRAGM

PLAN OF UNDER SIDE OF LOWER DIAPHRAGM

Witnesses:

William Coy

Wm M. Fredrick

Inventor:

Frederick E. Sickles

UNITED STATES PATENT OFFICE.

FREDERICK ELSWORTH SICKELS, OF CHICAGO, ILLINOIS.

IMPROVEMENT IN APPARATUS FOR SINKING PNEUMATIC PILES.

Specification forming part of Letters Patent No. 99,360, dated February 1, 1870; reissue No. 4,953, dated June 18, 1872.

Be it known that I, FREDERICK ELSWORTH SICKELS, of Chicago, Cook county, and State of Illinois, have invented a new and useful Improvement in the Apparatus for Sinking Pneumatic Piles; and I do hereby declare that the following is a full and exact description thereof, reference being had to the accompanying drawing and to the letters of reference marked thereon.

I will now state the usual method of construction and mode of using air-locks, and the usual method of expelling the excavated material and relieving the friction on the outside of the pile, so as to explain the difference between the usual apparatus and my improved apparatus for sinking pneumatic piles. In sinking pneumatic piles as heretofore practiced the air-lock is made separate from the pile, so as to be removed bodily, either to be reconnected to the same pile, after additional lengths had been placed on top, or connected to another pile, as might be required. In excavating by air-pressure as heretofore practiced the pressure supplied to the workman was depended upon exclusively to force out the excavated materials, thus making it necessary at times to put an undue pressure upon the workman, so as to be sure to have sufficient power to force out these materials; this excess of pressure rendering it difficult to obtain workmen who are constitutionally able to endure the great pressure, and the great pressure sometimes required forced the air out until the bottom edge of the pile, and while a portion of the air thus escaping had a tendency to loosen the materials around the pile and lessen the resistance to its descent, a larger portion of air, in escaping downward, traversed latterly the seams of material, and rose to the surface at such a distance from the pile as to be inoperative in lessening the friction in its descent. No means was provided to regulate or discharge the air on the sides of the pile.

I will now explain the nature and character of my improved apparatus: First, in my improved air-lock the cost of construction may be reduced in pneumatic piles of suitable size by temporarily using a portion of the pile to aid in forming the air-lock, and some of the parts may be so made as to be used in other piles if desired. Second, the cost of using the air-lock is reduced, as it is placed wholly below the top of the pile, and need not be disconnected and reconnected to lengthen the pile. Third, the cost of moving the excavated materials may be reduced, as in passing them up through the air-lock they reach the open air below the top of the pile. Fourth, in forcing out the excavated materials through a pipe I use two different pressures of air, acting in combination, one pressure being greater than the other. The lesser pressure only is supplied to the workman, while the greater pressure is prevented from acting on them, and only employed to act after the materials to be excavated have been put in motion by the lesser pressure within a pipe or inclosure. Fifth, lessening the friction and controlling the descent of the pile by delivering along its sides a stream of air regulated as required.

In the accompanying drawing, the same letters refer to the same part in each figure.

Figure 1:
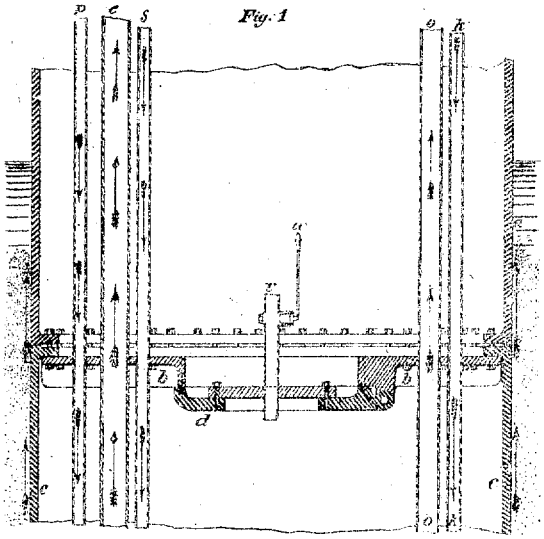
Figure 3:
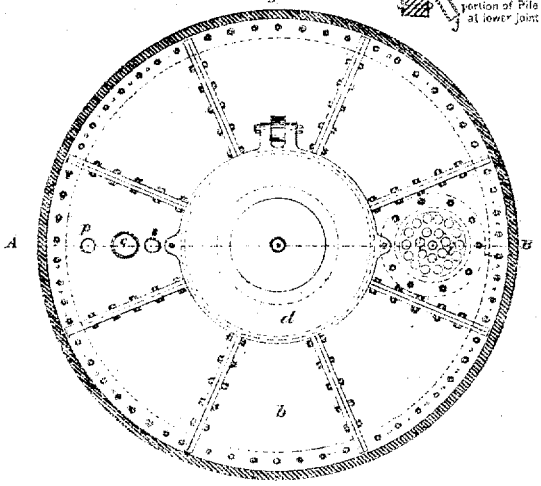
Figure 3:
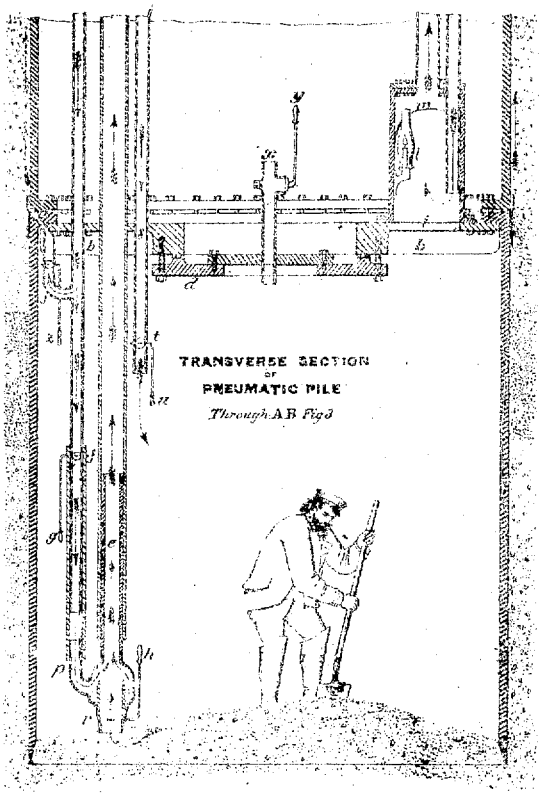

*a a a*, Figure 1, is a transverse section of the pneumatic pile, shown in the process of sinking, with the upper end omitted. *b b*, Figs. 1, 2, and 3, are the diaphragms, which, with the doors *d d*, Figs. 1, 2, and 3, and the sides *c c*, Fig. 1 of the pile, form the air-lock. *x*, Figs. 1 and 2, is the supply-cock, opened by the handle *y*, to fill the air-lock with the required pressure of air before opening the lower door, the upper door being then closed. *v*, Fig. 1, is a discharge-cock, opened by the handle W, to discharge the pressure from the air-lock before opening the upper door, the lower door being then closed. These doors admit the passage of men and materials without releasing the pressure on the bottom of the pile, as one door can be closed before the other is opened, as is usual in air-locks. All parts of the air-lock, excepting the part *c*, which forms a portion of the pile, can be removed, so as to be placed in other piles and used as often as required, the diaphragms *b b* being made in pieces and jointed, so as to be readily taken apart and put together. Thus a commodious air-lock is formed in each pile of suitable size, at substantially only the expense of the diaphragms *b b* and doors *d d*. If it is required to only use the diaphragms in one pile, they may be made with less expense in jointing the parts together; or they may be made in one piece, it being only necessary to make the top of the pile open by placing the air-lock below, and at the same time connecting the air-lock to the side of the pile, so as to hold it down against the upward pressure of air and permit a passage-way down into the air-lock. *e*, Figs. 1, 2, and 3, is the excavating-pipe, up which the materials are to be removed or projected by the combined action of the two currents of air. *r* is a valve in the excavating-pipe, operated by a handle, *h*. *p*, Figs. 1, 2, and 3, is the extra-pressure pipe, conveying air at a greater pressure than is supplied to the workman, and blowing up the excavating-pipe through a circular opening surrounding the excavating-pipe. *f* is a valve in the extra-pressure pipe, operated by the handle *g*. The excavating-pipe *e* and the extra-pressure pipe *p* are provided with slip-joints, so as to adjust their lower ends to the surface of the material to be removed. *s* is a supply-pipe to furnish fresh air to the workman and maintain sufficient pressure at the bottom of the pile to keep out the water. *t* is a valve in the supply-pipe, operated by the handle *u*, to prevent the escape of air upward, in case of accident to this pipe above the air-lock.

When the pressure of air furnished to the workman forces the sand or other materials to be excavated in at the bottom of the pipe *e*, they are still further impelled by the current of air rushing up the same pipe, supplied by the extra-pressure pipe *p*, and this extra pressure may be as much greater than the pressure supplied to the men as may be found necessary. The diamond-shaped arrows, Fig. 1, designate the line of motion of the excavated materials, and the barbed arrows signify the air-currents. By closing the valve *r* in the excavating-pipe and fully opening the valve *f* in the extra-pressure pipe *p*, any desirable pressure can be applied to force out the materials to be excavated that might otherwise stick in the pipe, without letting this pressure act on the workman. By using the extra-pressure pipe in combination with the supply-pipe the men are relieved of the excessive pressure, as a pressure is only supplied to them sufficient to keep out the water, and this pressure is at the same time used to force the materials within a pipe or inclosure, so as to come within the range of the greater pressure that fully expels them upward. The supply-pipe *s* and extra-pressure pipe *p* should have safety-valves applied to them to limit the pressure in each case, as may be desired. The upper ends of the supply-pipe and extra-pressure pipe should be connected to the machinery, supplying the air-pressure by means of couplings, so as to be readily connected and disconnected, as required, in lengthening the pile.

Figure 4:
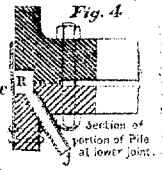

*j*, Fig. 1, is a pipe with a valve, *q*, operated by a handle, *z*, leading from the extra-pressure pipe to a recess, R, Fig. 4, extending around the outside of the pile at the lower joint. This recess is covered by a thin ring of metal, C, Fig. 4, fastened at its lower edge to the pile, and open around its upper edge, so as to permit the air to escape upward along the sides of the pile and loosen the materials, and thus diminish the resistance to the descent of the pile. The largest escape of air will be nearest the supply-pipe *j*, and tend to draw the pile in that direction; by shifting the direction of the greatest supply of air the direction of the descent of the pile will be changed. Fig. 4 shows a section of a portion of the pile at the lower joint on an enlarged scale, so as to exhibit the different parts. C, Fig. 4, is the thin plate to deflect the current upward as it issues out of the recess extending around the pile. *j*, Figs. 1 and 4, is the pipe coming from the extra-pressure pipe to feed this recess with air. The air escaping to loosen the materials around the pile may be supplied from any reservoir found most convenient. The valve *q* Fig. 1, in the pipe *j*, is to control the amount of air supplied to the recess to be blown up around the outside of the pile. If the air is delivered with considerable force upward it will keep close to the pile and tend to greatly lessen the friction in its descent, this provision being more particularly useful in sinking small piles to a great depth. The arrows on the outside of the pile, Fig. 1, show the line of motion of the air when blown out with great force. The piles can be loaded to force them down, and the material that cannot be economically blown out through the excavating-pipe may be passed up through the air-lock and thus be placed in the open air below the top of the pile. O, Figs. 1 and 2, is an exit-tube to allow the gases from the lamp *l* to escape. *m* is a reflector to throw the light downward to the workman through the glasses *i*, Figs. 1 and 3. K is a tube to supply air to the lamp.

What I claim as new, and desire to secure by Letters Patent, is—

1. Forming an air-lock within piles of suitable size by using temporarily a portion of the sides of the pile to aid in making the air-lock, substantially as herein described.

2. Constructing the air-lock below the top, for the purposes set forth.

3. Excavating the material by using two different pressures of air acting in combination, substantially as described.

4. Lessening the friction in the descent of the pile by blowing a current of air upward along its sides, substantially as described.

FREDERICK ELSWORTH SICKELS.

Witnesses:—
A. B. STOUGHTON,
ABRAHAM MOORE.